Feb. 17, 1925.

L. A. OSGOOD 1,526,434

SCALE

Filed Dec. 2, 1921    2 Sheets-Sheet 1

Inventor
L.A. OSGOOD
By his Attorneys
Cooper Kerr & Dunham

Feb. 17, 1925. 1,526,434
L. A. OSGOOD
SCALE
Filed Dec. 2, 1921 2 Sheets-Sheet 2
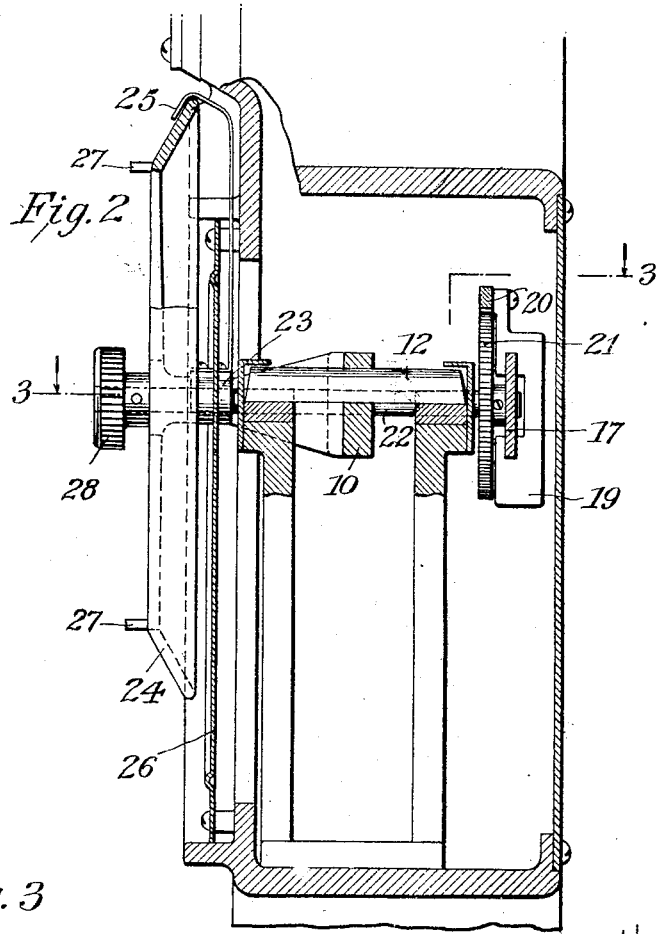
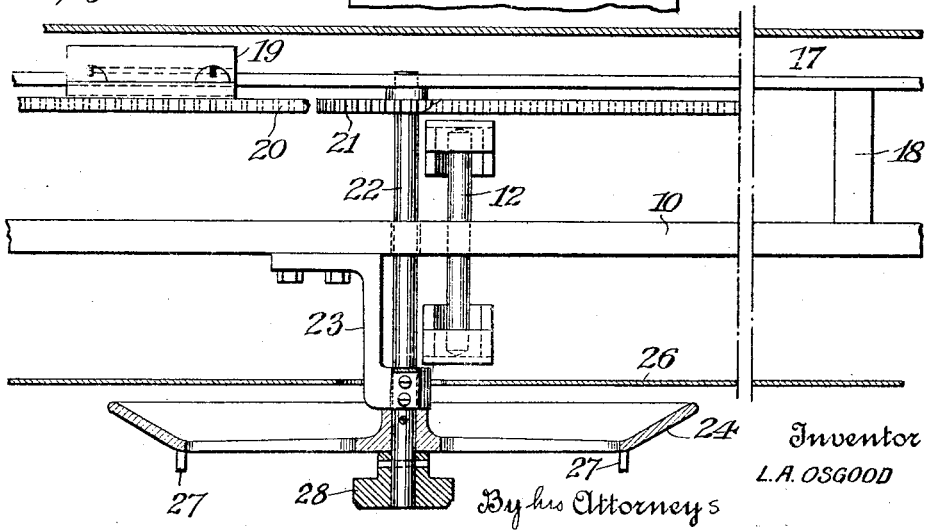
Inventor
L. A. OSGOOD
By his Attorneys
Cooper Kerr & Dunham Patented Feb. 17, 1925.

1,526,434

UNITED STATES PATENT OFFICE.

LOUIS A. OSGOOD, OF DAYTON, OHIO, ASSIGNOR TO INTERNATIONAL SCALE COMPANY, OF DAYTON, OHIO, A CORPORATION OF ILLINOIS.

SCALE.

Application filed December 2, 1921. Serial No. 519,345.

*To all whom it may concern:*

Be it known that I, LOUIS A. OSGOOD, a citizen of the United States of America, residing at Dayton, in the county of Montgomery and State of Ohio, have invented certain new and useful Improvements in Scales, of which the following is a full, clear, and exact description.

The present invention relates to improvements in tare devices for scales and more particularly to improvements in means for setting the tare poise or poises and for indicating the amount of tare.

Further objects and advantages will be set forth in further detail in the accompanying specification and shown in the drawings in which:

Fig. 2 is a vertical sectional view taken on line 2—2 of Fig. 1 with the tare wheel shown in central section.

Fig. 3 is a horizontal section taken on line 3—3 of Fig. 2.

Figure 1:
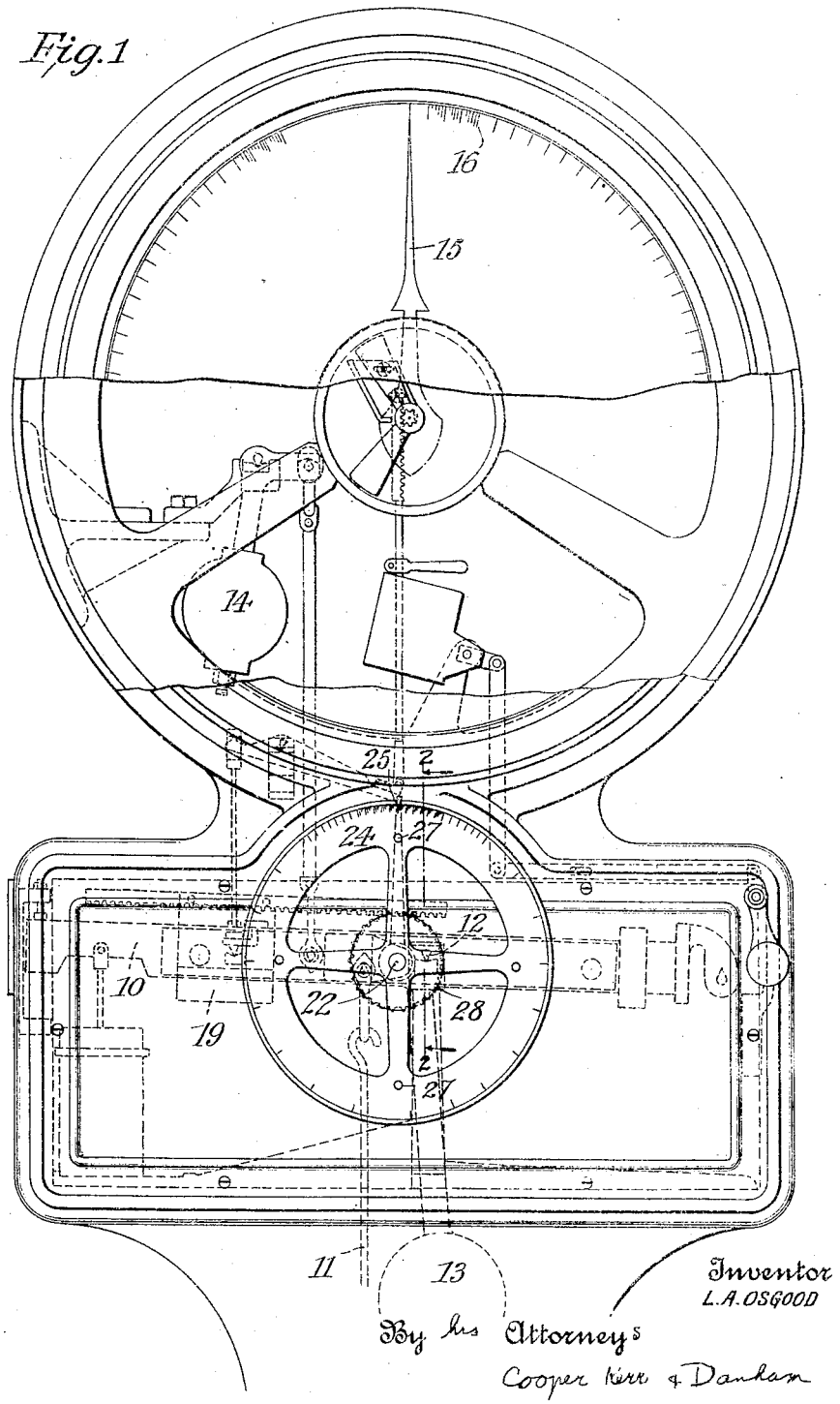
Fig. 1 shows a front view of the scale with certain parts broken away to show the interior construction.

The scale on which I have shown my improvements is of a type known to the trade as an International No. 601 scale. In general it comprises a scale beam 10 having connected thereto a draft rod 11. The beam is fulcrumed on pivots 12 and is provided with suitable automatic counterbalancing means such as pendulums 13 and 14.

The beam is also operatively connected with a pivotal weight indicator 15 which sweeps over a weight dial 16.

The scale is also provided with the usual dash pot and capacity weight device.

Unlike the usual International scales the tare beam 17 is located behind the main beam instead of in front of the same, as heretofore. The tare beam is supported from the main beam by the usual studs 18. Slidable upon the tare beam is a tare poise 19 preferably having the preponderance of weight in the rear of the beam. The tare poise has fastened to it a rack 20 having downwardly facing teeth which enmesh with a driving pinion 21. This pinion is fixed to a stud or shaft 22 which at its ends is rotatably supported in a tare beam and in a bracket 23 extending forwardly from the main beam 10 and at the opposite side thereof from the tare beam.

Rigidly carried on the front end of this shaft is a tare wheel 24 having a graduated periphery as shown in Fig. 1. The graduated portion is preferably disposed at an angle to facilitate the reading. Cooperating with the tare wheel is a fixed pointer 25 which is preferably supported upon the bracket 23.

A suitable cover plate 26 is fixed to the housing and is cut away around the bracket to permit the parts to swing freely without interference upon the movement of the beam.

Preferably the shaft or stud is located as close as possible to the pivot line of the beam to minimize the relative motion between the stud and housing.

To operate the tare device the operator grasps the tare wheel knobs 27 or central knob 28 and turns the same to the right or left, depending upon whether tare is to be increased or decreased. The turning movement of the tare wheel is converted into a horizontal motion by the rack and pinion and the tare poise is displaced to any desired point on the beam.

Reading of the amount of tare can then be taken from the dial or wheel periphery, the pointer serving as a reference point or reading line.

By locating the tare beam and poise upon the rear of the main beam and the wheel upon the front thereof, it is found that the tipping tendency of the beam about its front pivot is minimized. The tare beam and poise in effect act as a counterbalance for the weight of such parts of the reading and setting devices as are disposed to the front of the beam. By this counterbalancing the operation of the scale is improved, since excessive or unequal fulcrum pivot pressures are avoided.

What I claim is:

1. A weighing scale comprising, in combination, a fulcrumed main scale beam, a tare beam connected to and disposed at one side of the beam, a tare poise thereon, and a tare setting device supported by the main beam and located upon the opposite side thereof from the tare beam and poise.

2. A weighing scale comprising a fulcrumed main beam, an automatic counterbalance therefor, a tare beam connected to and disposed at one side of the main beam, a tare poise slidably mounted thereon, and a rotatable tare setting device disposed upon the other side of the beam and having operating connections to the said tare poise to slidably position the same on its beam.

3. A weighing scale comprising a fulcrumed main scale beam, a tare beam connected thereto at one side thereof, a poise thereon, a rack connected to said poise, a bracket carried by said main beam at the opposite side of the main beam from the tare beam, a shaft rotatably supported by said tare beam and bracket, a pinion thereon meshing with the said rack, a tare wheel carried upon the opposite end of said shaft, and a cooperating fixed pointed carried by the bracket.

4. A weighing scale comprising a fulcrumed main scale beam, a tare beam connected thereto, a poise carried thereby, a rack connected to said poise, and a setting device for said poise comprising a rotatable graduated wheel having a shaft carrying a pinion meshing with the aforesaid rack, and a fixed pointer cooperating with the graduated portion of the wheel, said setting devices being supported by the fulcrumed beam and swinging in unison therewith.

5. A weighing scale comprising a fulcrumed main scale beam having a variable displacement in accordance with variable loads thereon, a tare beam connected thereto, a poise carried thereby and a setting and reading device for said poise, comprising a graduated dial and cooperating pointer movable relatively to each other, and connections from the movable element to the slidable poise for sliding the latter to various positions upon its supporting tare beam, all of the parts of said setting and reading device being supported by the main scale beam and swinging in unison therewith.

6. A weighing scale, comprising in combination with a main beam and connected tare beam, a poise upon the said tare beam, a fulcrum pivot for the main beam, a tare setting device for said poise comprising a rotatable shaft supported by the main and tare beams and journaled adjacent the fulcrum pivot of the main beam, a pinion thereon, a rack meshing with the pinion for displacing the poise, means for rotating the shaft and thereby displacing the poise, and means for reading the extent of rotation of the shaft and thereby indicating the amount of load offset by the tare poise.

7. In a weighing scale comprising a fulcrumed main scale beam and connected tare beam carrying a poise, comprising in combination therewith means for displacing the poise and indicating the amount of load offset thereby, said means comprising, a rotatable and fixed element both carried by the main beam, reading graduations upon one of the said elements and operating connections from the said rotatable element to the tare poise for shifting the latter upon the rotation of the rotatable element, all of the said setting and reading devices being carried by the main beam and adapted to swing in unison therewith.

8. A tare poise shifting and reading means for a weighing scale having a tare beam with a slidable poise thereon, comprising in combination a supporting member movable in unison with the said beam, a rotatable wheel thereon having an angularly disposed graduated periphery, a pointer cooperating therewith, and operating connections from the rotatable wheel to poise for shifting the latter on its supporting beam in accordance with the setting of the wheel.

9. In a device of the class described, comprising in combination, an automatically counterbalanced dial scale, a fulcrumed main scale beam therein, a tare beam connected to and disposed at one side of the beam, a tare poise thereon, and a tare setting device supported by the main beam and located upon the opposite side thereof from the tare beam and poise.

10. In a device of the class described, comprising in combination, an automatically counterbalanced dial scale, a fulcrumed main scale beam therein, a tare beam connected thereto, a poise carried thereby, and a setting and reading device for said poise comprising a graduated dial and cooperating pointer movable relatively to each other and connections from the movable element to the sliding poise for sliding the latter to various positions upon its supporting tare beam, all of the parts of said setting and reading device being supported by the main scale beam and swinging in unison therewith.

11. A scale comprising a fulcrumed main scale beam, a pivoted indicator and an automatic counterbalance operatively connected therewith, a tare beam connected to the main beam and carrying a poise, means for displacing the poise and indicating the amount of load offset thereby, said means comprising a rotatable and fixed element both carried by the main beam, reading graduations upon one of said elements and operating connections from said rotatable element to the tare poise for shifting the latter upon the rotation of the rotatable element, all parts of said setting and reading device being carried by the main beam adapted to swing in unison therewith.

In testimony whereof I hereto affix my signature.

LOUIS A. OSGOOD.